(12) United States Patent
Swenson et al.

(10) Patent No.: US 8,648,858 B1
(45) Date of Patent: Feb. 11, 2014

(54) HYBRID TEXT AND IMAGE BASED ENCODING

(75) Inventors: Erik R. Swenson, San Jose, CA (US); Vijay Kumar, Santa Clara, CA (US)

(73) Assignee: Skyfire Labs, Inc., Mountain View, CA (US)

( * ) Notice: Subject to any disclaimer, the term of this patent is extended or adjusted under 35 U.S.C. 154(b) by 823 days.

(21) Appl. No.: 12/731,866

(22) Filed: Mar. 25, 2010

Related U.S. Application Data

(60) Provisional application No. 61/163,365, filed on Mar. 25, 2009.

(51) Int. Cl.
*G06T 17/00* (2006.01)

(52) U.S. Cl.
USPC .......................................................... 345/428

(58) Field of Classification Search
USPC .......................................................... 345/428
See application file for complete search history.

(56) References Cited

U.S. PATENT DOCUMENTS

| | | | |
|---|---|---|---|
| 5,204,756 A * | 4/1993 | Chevion et al. ................ | 382/239 |
| 5,708,511 A | 1/1998 | Gandhi et al. | |
| 5,821,915 A | 10/1998 | Graham et al. | |
| 5,832,126 A * | 11/1998 | Tanaka ............................ | 382/239 |
| 5,862,412 A * | 1/1999 | Sugiyama ........................ | 710/68 |
| 6,215,904 B1 * | 4/2001 | Lavallee ......................... | 382/234 |
| 6,272,484 B1 * | 8/2001 | Martin et al. .......................... | 1/1 |
| 6,292,834 B1 | 9/2001 | Ravi et al. | |
| 6,397,230 B1 | 5/2002 | Carmel et al. | |
| 6,563,517 B1 * | 5/2003 | Bhagwat et al. ............... | 715/735 |
| 6,578,201 B1 | 6/2003 | LaRocca et al. | |
| 6,650,773 B1 * | 11/2003 | Maurer et al. ................. | 382/166 |
| 6,993,726 B2 * | 1/2006 | Rosenholtz et al. ........... | 715/835 |
| 7,069,432 B1 * | 6/2006 | Tighe et al. .................... | 713/151 |
| 7,161,506 B2 * | 1/2007 | Fallon .............................. | 341/51 |
| 7,194,140 B2 * | 3/2007 | Ito et al. ......................... | 382/251 |
| 7,257,264 B2 * | 8/2007 | Nakayama et al. ............ | 382/239 |
| 7,345,688 B2 * | 3/2008 | Baudisch et al. .............. | 345/467 |
| 7,358,867 B2 * | 4/2008 | Fallon .............................. | 341/51 |
| 7,483,575 B2 | 1/2009 | Fukuhara et al. | |
| 7,612,695 B2 * | 11/2009 | Yang et al. ....................... | 341/51 |
| 7,725,604 B1 * | 5/2010 | Levenberg .................... | 709/246 |
| 7,747,781 B2 * | 6/2010 | Maurya et al. ................. | 709/246 |
| 7,747,782 B2 * | 6/2010 | Hunt et al. ..................... | 709/246 |
| 8,045,801 B2 * | 10/2011 | Kanatsu ......................... | 382/176 |
| 8,194,982 B2 * | 6/2012 | Iwasaki ......................... | 382/182 |
| 2002/0037100 A1 * | 3/2002 | Toda et al. ..................... | 382/166 |

(Continued)

OTHER PUBLICATIONS

Kwang Bok Lee and Roger A. Grice, "An Adaptive Viewing Application for the Web on Personal Digital Assistants", SIGDOC'03, Oct. 12-15, 2003, San Francisco, California.*

(Continued)

*Primary Examiner* — Ryan R Yang
*Assistant Examiner* — Jin Ge
(74) *Attorney, Agent, or Firm* — Fenwick & West LLP

(57) ABSTRACT

A configuration for encoding and decoding the data is disclosed herein. A server retrieves webpage content to filter and extract text and image data. The text data is encoded using a lossless encoder, whereas the image data is downsampled to a lower resolution and encoded using a lossy encoder. The encoded text and image data is transmitted over a network. Once the encoded data is received on the client device, the text and image data is decoded using an inverse encoding algorithm and resized at a resolution appropriate to the native resolution of the display device.

18 Claims, 13 Drawing Sheets

(56) References Cited

U.S. PATENT DOCUMENTS

| | | |
|---|---|---|
| 2002/0059368 A1 | 5/2002 | Reynolds |
| 2002/0131083 A1 | 9/2002 | Hamzy et al. |
| 2003/0020722 A1 | 1/2003 | Miura |
| 2003/0039312 A1 | 2/2003 | Horowitz et al. |
| 2003/0079222 A1 | 4/2003 | Boykin et al. |
| 2003/0177269 A1 | 9/2003 | Robinson et al. |
| 2004/0067041 A1 | 4/2004 | Seo et al. |
| 2004/0095400 A1* | 5/2004 | Anderson et al. ............ 345/864 |
| 2004/0109005 A1 | 6/2004 | Witt et al. |
| 2005/0081158 A1* | 4/2005 | Hwang .................. 715/740 |
| 2005/0100233 A1 | 5/2005 | Kajiki |
| 2005/0147247 A1 | 7/2005 | Westberg et al. |
| 2005/0232359 A1 | 10/2005 | Cha |
| 2005/0267779 A1 | 12/2005 | Lee et al. |
| 2006/0028673 A1* | 2/2006 | Ryu et al. .................. 358/1.15 |
| 2006/0069797 A1 | 3/2006 | Abdo et al. |
| 2006/0095944 A1 | 5/2006 | Demircin et al. |
| 2006/0168101 A1 | 7/2006 | Mikhailov et al. |
| 2006/0174614 A1 | 8/2006 | Dong et al. |
| 2006/0176305 A1* | 8/2006 | Arcas et al. ................ 345/428 |
| 2006/0218285 A1 | 9/2006 | Talwar et al. |
| 2007/0098283 A1* | 5/2007 | Kim et al. .................. 382/239 |
| 2007/0130525 A1* | 6/2007 | Murphy et al. ............... 715/747 |
| 2007/0172137 A1* | 7/2007 | Mori .......................... 382/239 |
| 2009/0074294 A1* | 3/2009 | Iwasaki .................... 382/182 |
| 2009/0089448 A1* | 4/2009 | Sze et al. .................... 709/231 |
| 2009/0089707 A1* | 4/2009 | Knowles .................... 715/800 |
| 2009/0245668 A1 | 10/2009 | Fukuhara et al. |
| 2009/0262126 A1* | 10/2009 | Zhang et al. ............... 345/582 |
| 2009/0305682 A1* | 12/2009 | Spalink .................. 455/414.3 |
| 2010/0106857 A1* | 4/2010 | Wyler ........................ 709/246 |
| 2010/0223398 A1* | 9/2010 | Ahmed et al. ............... 709/247 |

OTHER PUBLICATIONS

Jacob O. Wobbrock, Jodi Forlizzi, Scott E. Hudson, Brad A. Myers, "WebThumb: Interaction Techniques for Small-Screen Browsers", UIST'02, Oct. 27-30, 2002, Paris, France.*

Björk, S., Holmquist, L.E., Redström, J., Bretan, I., Danielsson, R., Karlgren, J., and Franzén, K. West: A Web Browser for Small Terminals. Proc. UIST' 99 (Asheville, USA, Nov. 1999), 187-196.*

Heidi Lam and Patrick Baudisch, "Summary Thumbnails: Readable Overviews for Small Screen Web Browsers", CHI 2005, Apr. 2-7, 2005, Portland, Oregon.*

Matt Jones, Gary Marsden, Norliza Mohd-Nasir, Kevin Boone, George Buchanan, "Improving Web interaction on small displays", 1999 Published by Elsevier Science B.V.*

Li-qun Chen, Xing Xie, Wei-ying Ma, Hongjiang Zhang, He-qin Zhou, Huanqing Feng, "DRESS: A Slicing Tree Based Web Representation for Various Display Sizes", Conference: World Wide Web Conference Series—WWW , 2003.*

Xin Fun, Xing Xie, Wei-Ying Mu, HongiJiung Zhnng, He-Qin Zhou, "Visual Attention Based Image Browsing on Mobile Devices", Proceeding ICME '03 Proceedings of the 2003 International Conference on Multimedia and Expo—vol. 2 pp. 53-56.*

Cheng-You Wang, Zheng-Xin Hou, Kai He, Ai-Ping Yang, JPEG-Based Image Coding Algorithm at Low Bit Rates with Down-Sampling and Interpolation Wireless Communications, Networking and Mobile Computing, 2008. WiCOM '08. 4th International Conference on Oct. 12-14, 2008.*

Hsieh, M. et al., "Stateful Session Handoff for Mobile WWW," Information Sciences 2005 [online] [Retrieved on Apr. 10, 2008] Retrieved from the Internet<URL:http://64.233.179.104/scholar?num=30&hl=en&lr=&q=cache:hiW5F6of2 CUJ:140.115.51.197/web/PaperManage/Paper/Stateful%2520session%2520handoff%2520for%2520mobile%2520WWW.pdf>.

PCT International Search Report and Written Opinion, PCT/US07/83218, Jun. 12, 2008, 7 pages.

PCT International Search Report and Written Opinion, PCT/US07/83214, Apr. 30, 2008, 7 pages.

PCT International Search Report and Written Opinion, PCT/US07/83203, Apr. 3, 2008, 9 pages.

* cited by examiner

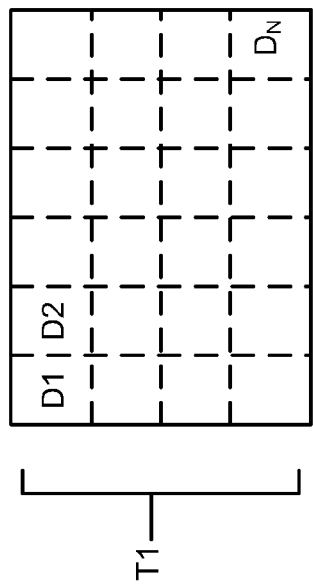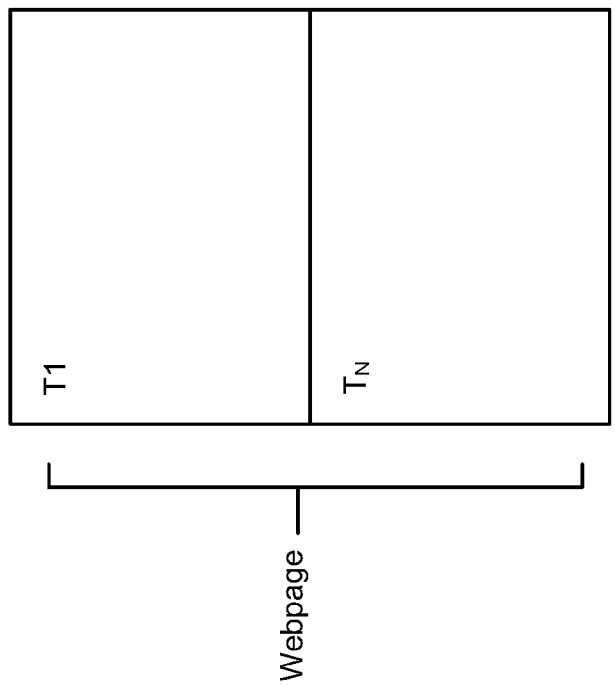
FIG. 5a
FIG. 5b
FIG. 5

HYBRID TEXT AND IMAGE BASED ENCODING

CROSS REFERENCE TO RELATED APPLICATIONS

This application claims the benefit of U.S. Provisional Application No. 61/163,365, filed Mar. 25, 2009, which is incorporated by reference in its entirety.

BACKGROUND

1. Field of Art

The disclosure generally relates to the field of mobile web access.

2. Description of the Related Art

Mobile web access, or accessing web content on a web browser executing on a handheld mobile device has become commonplace. Mobile web access however, suffers from several limitations and usability problems related to mobile devices' small screen size, limited bandwidth and limited processing capability. The small screen size of a handheld mobile device makes it difficult to render text and graphics configured to be viewed on a standard size desktop computer screen. The limited bandwidth available to handheld mobile devices combined with limited processing capabilities pose additional challenges in delivering a satisfactory web browsing experience to user because of the long page load and refresh times. For example, an independently processing web browser executing on a mobile device would take a very long time to process and load content rich webpages (or web pages).

One solution to overcome the above limitations is to use a proxy server to speed up webpage load times. Proxy servers access web content, process the content and deliver the processed content of a smaller data size to the mobile device. Because the web browser functions are processed in the proxy server, the mobile device can retrieve the web content from the proxy server much faster than it can from accessing web content and processing it locally.

However, processing web content on a proxy server poses several issues, including issues with the delivery of the browsing experience to the client user, such as interacting with the webpage. For example, if the user interacts with the webpage, the mobile device must instruct the proxy server to interact with the webpage in the same manner. Subsequently, the proxy server must process the webpage according to the instructions and transmit the processed data to the requesting mobile device. The process therefore greatly increases the latency within the system evident to the user and provides a poor web browsing experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 5*a* and 5*b* illustrate one embodiment of the thumbnail and desktop tiles used encode webpage content.

DETAILED DESCRIPTION

Figure 1:
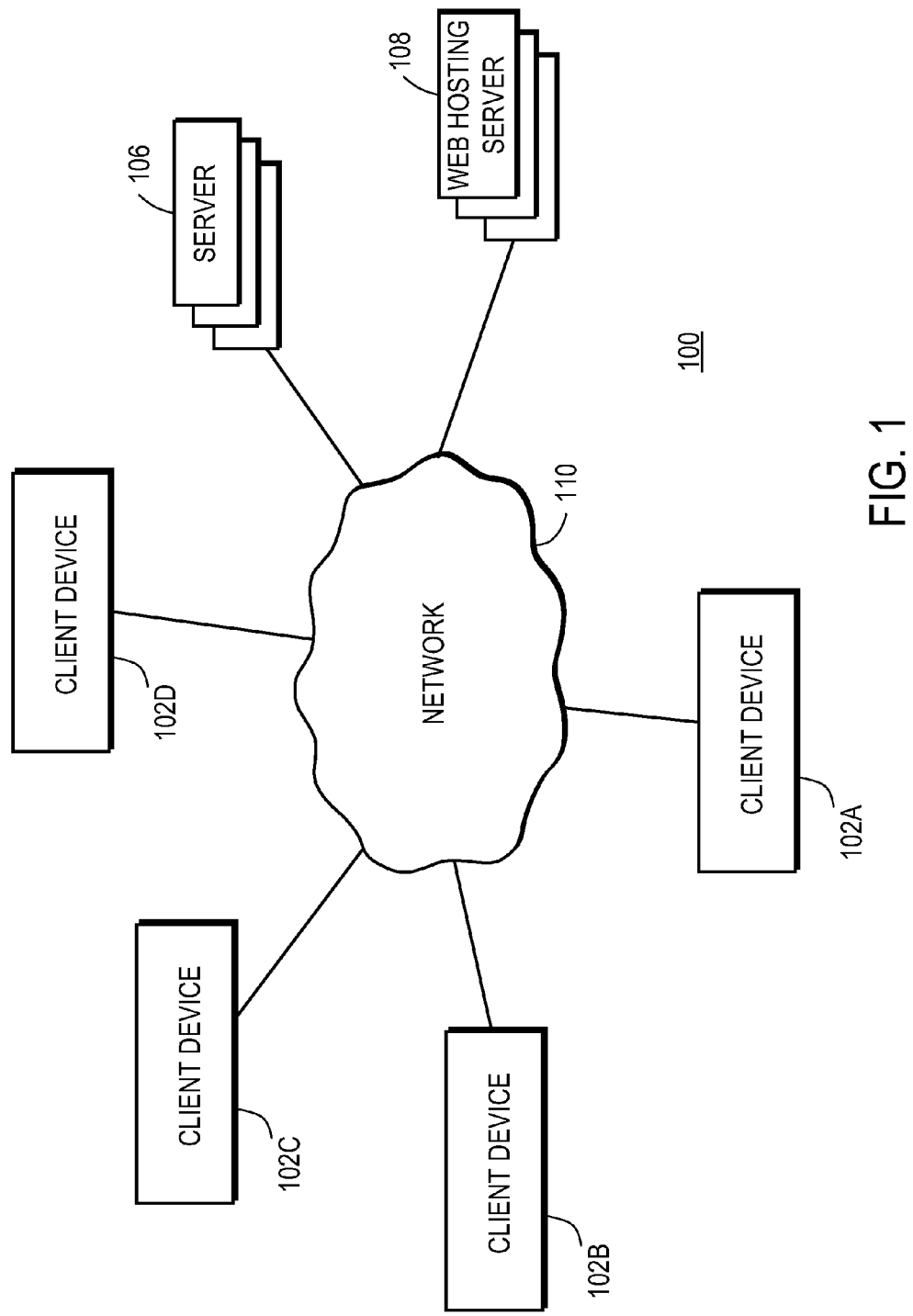
FIG. 1 is a high-level block diagram of a computing environment according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of disclosed system, method and computer readable storage medium seek to deliver webpage (or web page) content to a mobile device to enable faster webpage load times and provide a richer user browsing experience. By providing hi-resolution encoded text data and low resolution image data, the system reduces the size of the data sent to the mobile device, enabling faster page loads. Additionally, unlike retrieving text data of different resolution corresponding to different zoom levels, since the encoded text data is locally stored at a hi-resolution, it is rendered much faster at one or more zoom levels within an application executing on a mobile device 102.

The data is encoded by retrieving a webpage (or web page), responsive to a request by filtering the text and image data within the webpage content. The identified text data is extracted from the webpage content and rendered as glyph data and string text or as an image of the text data. A lossless encoder is applied to the extracted text data to generate compressed text data with no loss of resolution. Furthermore, image data is identified within webpage content and extracted as an image. The extracted image is downsampled to a lower resolution. A lossy encoder is then applied to the downsampled image to generate encoded image data. The encoded image data and the encoded text data are transmitted over a network.

Additionally, embodiments of disclosed system, method and computer storage medium enable faster page load time and a better user browsing experience on a mobile device by decoding image data and text data to generate a webpage data described herein. The webpage data is rendered on a mobile device by first receiving the encoded text and image data. The encoded text data is decoded to produce full resolution text data and the encoded image data is decoded to produce partial resolution image data. The decoded image and text data are stored locally on the mobile device or remotely. The stored text and imaged data is resized to a first resolution as determined by a first zoom level of an application rendering the webpage on the mobile device. The resized text and image data are displayed on the application executing on the mobile device.

System Architecture

FIG. 1 is a high-level block diagram of a computing environment 100 according to one embodiment. It is noted that for ease of discussion, in most instances FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral (e.g. "102" in the text refers to reference numerals "102A" and/or "102B" in the figures).

FIG. 1 illustrates client devices (or devices) 102A-D (generally 102), a plurality of encoding servers 106, and a plurality of web hosting servers 108 connected by a network 110. At a high level, an application executing on a client device 102 requests webpage content over the network 110. The server 106, responsive to the request received through the network 110, retrieves the webpage content over the network 110 from the appropriate webpage hosting server 108. Additionally, the server 106 identifies and extracts text data and image data from the retrieved webpage content, encodes the text and image data separately and transmits the encoded data over the network 110. The client device 102 receives the encoded text and image data, decodes the data and displays the data using an application executing on the client device 102.

The network 110 represents the communication pathways between the client device 102, the encoding server 106 and the webpage hosting server 108. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The web hosting server 108 is an entity that provides webpages and/or other electronic documents to client devices 102. The web hosting server 108 can be, for example, a major Internet web site operated by a national media outlet, a personal blog on a web server operated by a lone individual, and/or another distributor of web pages. While only a plurality of web hosting servers 108 are shown in FIG. 1, embodiments of the environment 100 can have thousands or millions of different publishers. Only a plurality of web hosting servers 108 are shown for purposes of clarity. This description uses the term "webpage" to refer to any electronic file, e.g., document, media, and the like, served by a web hosting server 108, regardless of whether the document is technically a webpage.

At least some of the webpages served by the web hosting server 108 have regions that can be characterized as image and/or text. For example, a webpage may contain text, such as a news story and images which can be related to the news story. Additionally, web page may contain text or image ads hosted by the webpage publisher. The images can be embedded within text, displayed in the background of the text, as a banner across the top or the bottom of the page, along the left and/or the right side margin of the page. Collectively, all the data displayed on a webpage may be characterized as image and/or text data.

An encoding server 106 represents an entity that receives webpage content request from a client device 102. The encoding server 106 is sometimes referred to as the "server." FIG. 1 illustrates a plurality of servers, embodiments however, can have many more participating servers. The encoding server 106 retrieves webpage content responsive to a user request 102. The image data and the text data from the webpage content is extracted and separately encoded by software and/or hardware executing on the server. Subsequently, the encoding server 106 transmits the encoded image and text data over the network 110.

The client device 102 represents any entity operated by a user that receives webpage data from the encoding server 106. The client device 102 is sometimes referred to as a "mobile device" or a "display device." In one embodiment, the client device 102 includes a computer system utilized by an end-user to communicate with other computers on the network 110 in order to view a webpage. In other embodiments, the client device 102 includes a network-capable device other than a computer system, such as a personal digital assistant (PDA), a cellular telephone, a smartphone, a pager, a television "set-top box" etc. Although FIG. 1 illustrates only four client devices, 102A-102D, embodiments of the present invention can have thousands or millions of client devices connected to the network 110.

Thus, the system described herein provides a richer webpage browsing experience to an end-user of a client device 102 by providing fast page load times and by providing fast rendering of text once the user interacts with the loaded webpage. In contrast to the conventional PCM mode operation where a macroblock of a frame is either encoded losslessly using the PCM mode, or in a lossy mode without using the PCM mode for higher compression ratio, the hybrid encoding mode enables the encoding server 106 to flexibly encode the text data on the webpage losslessly while the image data can be encoded in a lossy mode. As such, the webpage data is rendered on an application executing on the client device 102 with hi-resolution text data and low resolution image data. The end user is thus able to read hi-resolution text at several different zoom levels without having to wait for the encoding server 106 to fetch new, higher resolution text data.

Example Computing Machine Architecture

Figure 2:
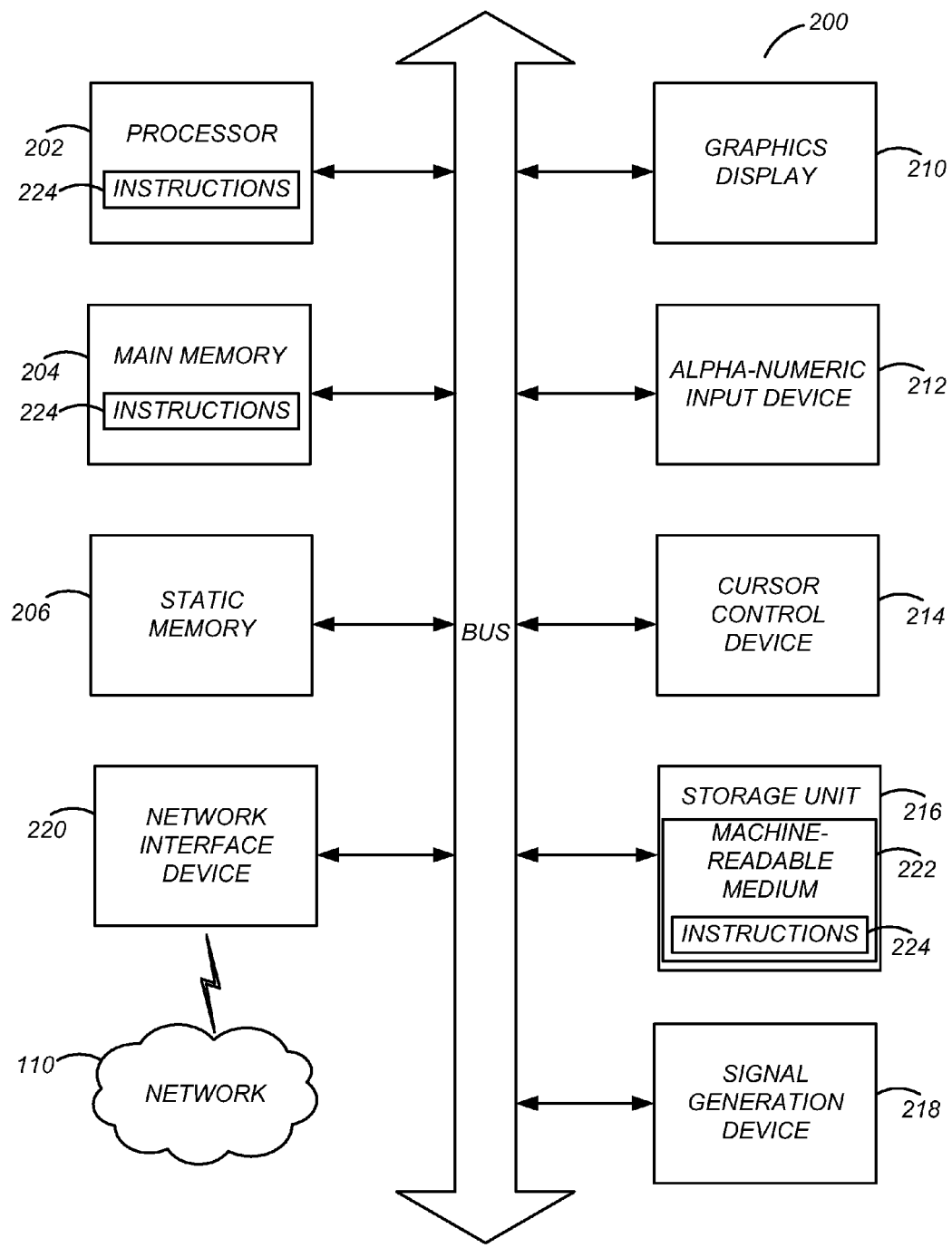
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine 200. It is noted that the computing machine 200 may be a system or part of a system, e.g., two or more machines operating together or one or more machines operating with one or more other devices. The computing entities illustrated in the environment 100 (e.g., 102A-D, 106, 108) are structured similarly to the computing machine 200 and can be further customized for particular functional configurations (e.g., operations) as described further herein.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for Encoding Data

Figure 3:
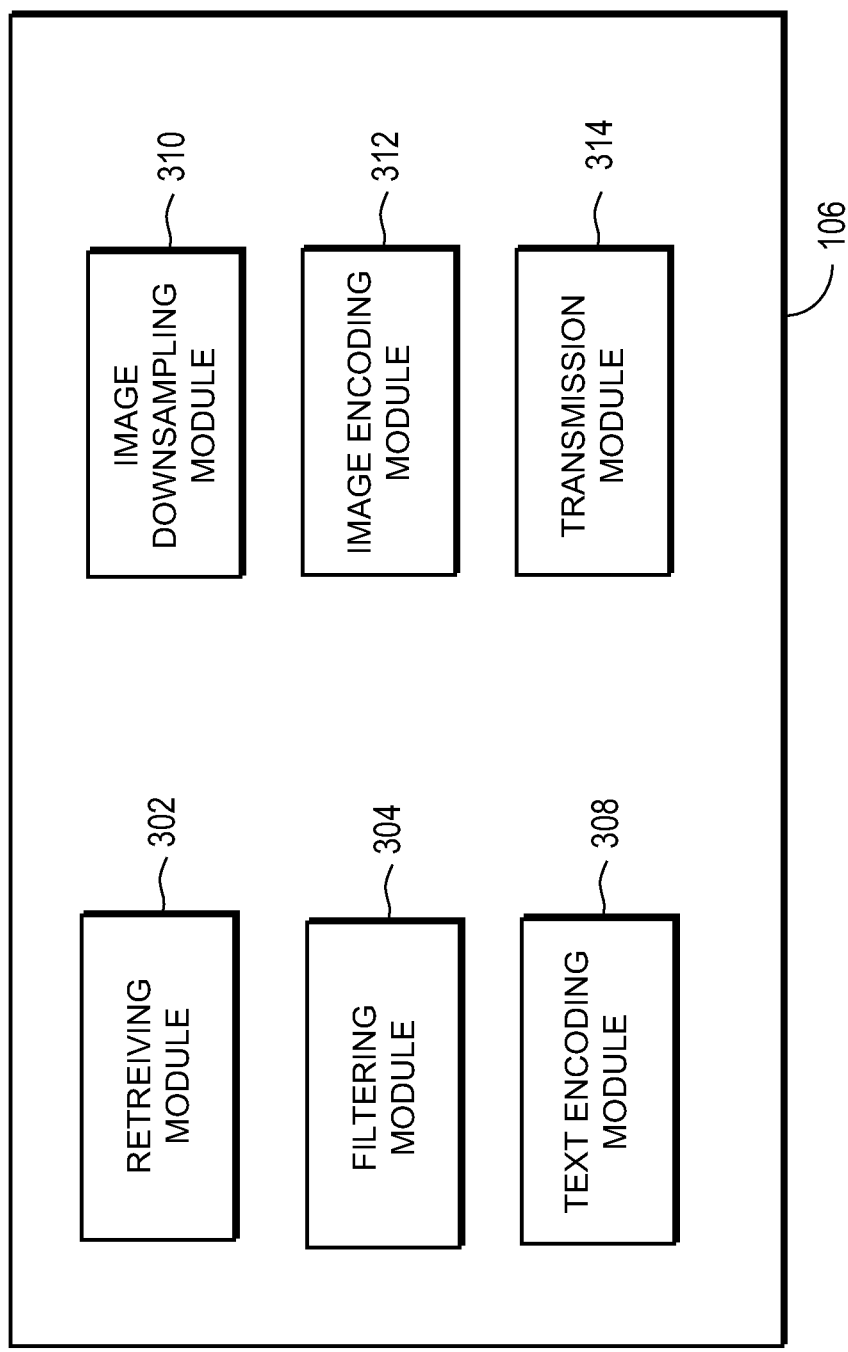
FIG. 3 illustrates one embodiment of a high level block diagram of a module for encoding webpage content.

Referring now to FIG. 3, it illustrates an embodiment of the encoding server (or system) 106. As noted previously, the encoding server 106 is structurally configured similar to the computing machine 200 and further configured as noted herein. The encoding server 106 is illustrated as a high-level block diagram of modules configured to encode text data and image data within webpage content. Upon reviewing the descriptions herein, those of skill in the art will recognize that other embodiments can have different and/or other modules than the ones described here, and that the functionalities can be distributed among the modules in a different manner. The encoding server 106 includes a webpage retrieval module 302, a text/image filtering module 304, a text encoding module 308, an image downsampling module 310, an image encoding module 312 and a transmission module 314. The modules are configured to function and interoperate as described herein.

The encoding server 106 includes the web page retrieval module 302 which retrieves webpage content from a web hosting server 108. In one embodiment, the webpage retrieval module receives a request to retrieve a webpage from a user. Responsive to the request, the web page retrieval module accesses the location specified by the user request and retrieves webpage content from the appropriate location.

The text/image filtration module 304 classifies webpage data as text and/or image data. In one embodiment, the filtration module 304 classifies webpage data as text based on detecting sharp edges in the retrieved webpage data. In another embodiment, other edge detection algorithms, such as search-based edge detection methods, known to those skilled in the art may be used for the determination. In another embodiment, the filtration module 304 may use other algorithms, for example, content-based analysis, to determine whether to classify data as text or image. Additionally, the filtration module 304 filters webpage data based on a classification of image and/or text. In one embodiment, once particular data is identified as text data, the filtration module 304 extracts the text data by copying the text data as image data at a full resolution. This can be accomplished by modifying an html renderer, like Gecko to render a copy of the text data into a separate buffer that is easily identified. The text can be rendered normally into the image buffer as well and then removed in module 308. Text pixels can be replaced with a background color to remove it from the image. A good choice is the pixel immediately to the left of the replaced pixel. In another embodiment, the identified text data is rendered as glyph and string text. In another embodiment, the identified image data is rendered as an image in the filtration module 304.

In another embodiment, the filtering module 304 determines data to be text based on metadata associated with the webpage content. In another embodiment, the text/image filtration module 304 picks two integer values corresponding to the two dominant colors of the webpage image frame, and replaces one value with another one. In this case, the text data is bi-level run data that is a series of runs between replaced and static pixels. Each time the filter of the text/image filtering module 304 toggles between replacing a pixel and not replacing a pixel, the run between such states is encoded. For example, for a image frame of black text with white background, the text/image filtering module 304 may pick value 1 for white pixel and value 2 for a black pixel, and replace the black pixels with white pixels after extracting the bitmap of the image frame. As such, after filtering, the white image data can be compressed with a higher compression ratio. It is noted that, in other embodiments, more than two colors (e.g., black and white) can be used to generate bitmap data of the image frame. An example of filtering data is presented in U.S. application Ser. No. 11/929,718, filed on Oct. 30, 2007, which is herein incorporated by reference.

The text encoding module 308 receives the filtered text data from the filtration module and losslessly encodes the text data. In one embodiment, the text encoding module 308 encodes the text data using a run-length (RL) algorithm such as unsigned exp-golomb codes to process the data in a scanline order to produce encoded data which is lossless. In another embodiment, a lossless compression scheme such as portable network graphics (PNG) is used to encode the text data. In other embodiments other proprietary lossless encoding schemes may be used to compress the text data. The text encoding module thereby produces encoded text data with no loss of resolution despite having a smaller data size.

The image downsampling module 310 receives the filtered image data and downsamples the image data, thereby reducing the spatial resolution of the image. In one embodiment, the downsampling module 310 reduces the spatial resolution of an image from 960×960 pixels to 320×320 pixels, for example. In other embodiments, other downsampling ratios may be used to reduce the spatial resolution of the image. In another embodiment, other methods of downsampling known to those skilled in the art may be used to downsample the image data.

The image encoding module 312 encodes the downsampled image. In one embodiment, the image encoding module 312 is a video encoder using the H.264 standard for image compression, wherein the image of a static web page can be compressed as a video frame. For example, in one embodiment, the encoding module 312 employs the major components used in the H.264 video compression standard. For example, the image encoding module 312 also uses the flexible macroblock sizes ranging from 16×16 to 4×4. The various macro and sub-macroblock size allow fine-grained tuning of the blacks to the content being encoded. Other H.264 components, such as logarithmic quantizer, may also be used to perform the compression. Those skilled in the art will recognize that H.264 is used only by way of example and that a variety of other encoding and compression schemes may be used. In other embodiment, other image compression methods, such as fractal compression, JPEG, etc., may be used to compress the downsampled image data. An example of compressing an image as a static video frame is provided in U.S. application Ser. No. 11/929,718, filed on Oct. 30, 2007, which is herein incorporated by reference.

It is noted that the filtering module 306, the text encoding module 308, the image downsampling module 310, and the image encoding module 312 can be implemented in several ways. In one embodiment, downsampling or encoding is handled by dedicated hardware with a very low latency encoder. In another embodiment, image of the text data or the image data may be compressed by a software encoder as a video frame. Other embodiments may implement the encoding modules 308, 312 and downsampling module 310 in both hardware and/or software. Other embodiments perform different and/or include additional modules than the one described here.

The transmission module 314 transmits the encoded image and the encoded text data over the network 110. The transmission may be performed by sending data over a network configuration such as the World Wide Web, as described above.

Figure 4:
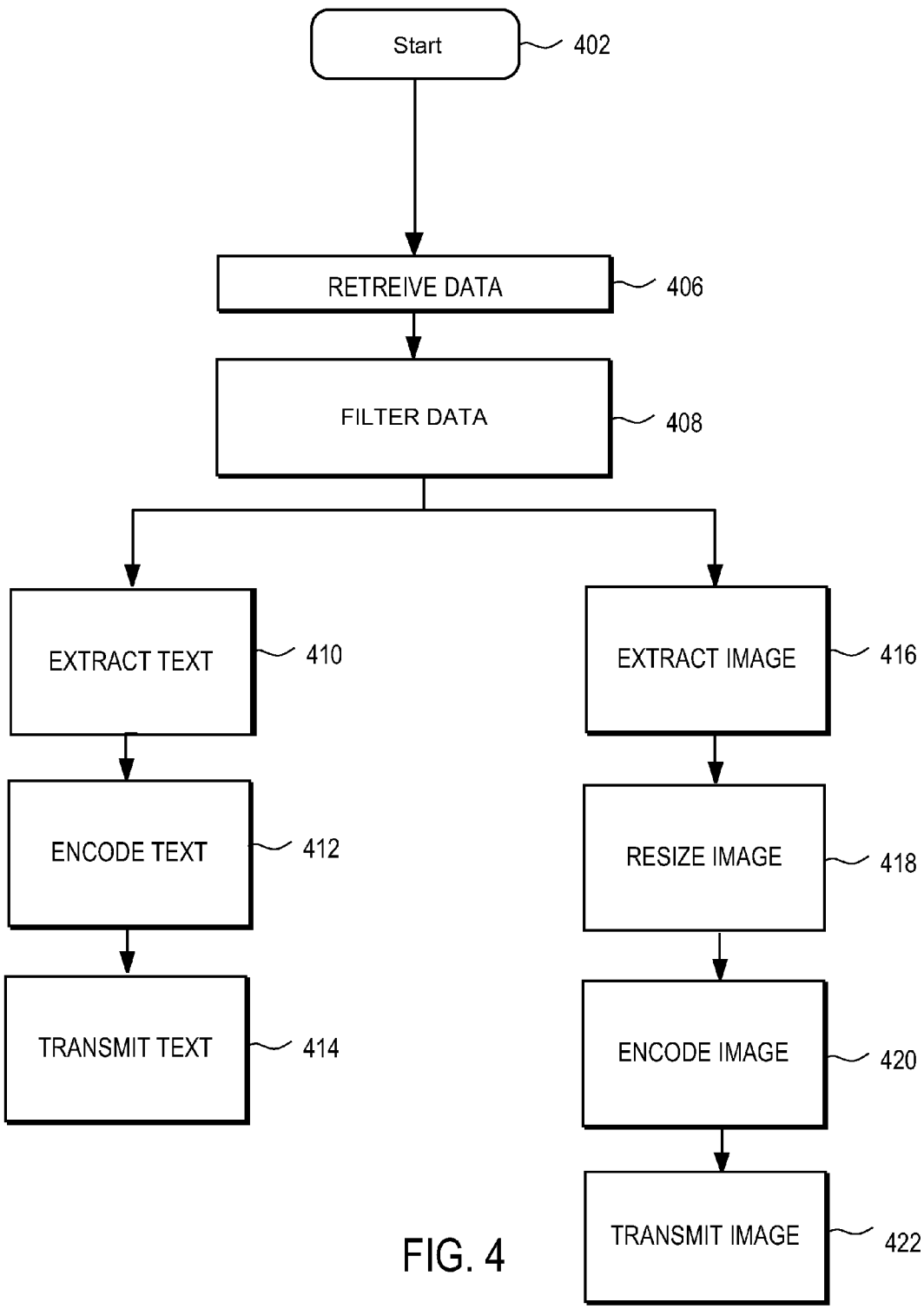
FIG. 4 illustrates one embodiment of a process for encoding webpage content.

FIG. 4 is a flow chart illustrating the operation of the encoding server 106 according to one embodiment. The process starts 402 and retrieves 406 data from a webhosting server 108. The filtering module 304 filters 408 the retrieved data, classifying the retrieved data as text and/or image data. In response to a determination of text data, the filtering unit 304 extracts 410 the text data. The extracted text data is subsequently encoded 412 by the encoding module 308 and transmitted 414 over a network 110. Additionally, in response to a determination of image data, the filtering unit 304 extracts 416 the image data. The extracted image data is subsequently resized 418 by the image downsampling module 310, encoded 420 by the image encoding module 310 and transmitted 422 over a network 110 by the transmission module 314. Those of skill in the art will recognize that other embodiments can perform the steps of FIG. 4 in different orders. Moreover, other embodiments can include different and/or additional steps than the ones described herein.

Initially, the encoding process starts 402 on the server 106, the process retrieves 406 data stored on a terminal over a network 110. The server 106 retrieves 406 data by accessing a particular location specified in a URL or by accessing a particular location responsive to an address provided by a client device 102. In other embodiments, the process retrieves 406 only a part of the webpage data based on the identity of client device 102 or responsive to the local zoom level of an application executing on the client device 102. An example of an embodiment retrieving a portion of a webpage is shown in FIGS. 5a and 5b as referenced below.

Referring now to FIGS. 5a and 5b, they are examples of using one or more portions of a webpage to perform the filtering 408 and extraction 410 steps detailed below. As shown in FIG. 5a, in one embodiment, the webpage is divided into one or more thumbnail tiles, T1 ... $T_N$, N representing an integer value. Thus if the process only has to transmit a portion of the webpage, it may only send one or more thumbnail tiles to reduce the amount of data sent over the network to a client device 102 and to reduce the amount of processing required on the server in regards to the filtering 408 and extraction 410 steps.

FIG. 5b illustrates desktop tiles D1 ... $D_N$, N representing an integer value. Desktop tiles D1 ... $D_N$ are hi-resolution tiles that comprise a portion of a thumbnail tile T1 ... $T_N$. Unlike thumbnail tiles T1 ... $T_N$, which are low resolution, desktop tiles are hi-resolution and therefore contain more data and are larger in data size. Thus, although desktop tiles deliver webpage content containing more detail, they take longer to transmit over a bandwidth limited network because of their larger size. Additionally, desktop tiles require a longer load time because it takes more processing to display a desktop tile as compared to a thumbnail tile. Thus, in one embodiment the server 106 may retrieve a thumbnail tile or a desktop tile depending on the data requested by the client device. In another embodiment, the server 106 may deliver a thumbnail tile at an intermediate stage, while processing and delivering one or more desktop tiles.

Continuing with the process 400, the retrieved 406 data is filtered 408 by classifying the webpage data as text data and/or image data. The retrieved data is classified and filtered 408 by applying an edge detection algorithm or by using any one of the methods disclosed above in reference to the filtration module 304.

Once the retrieved 406 webpage data is classified and filtered 408 as text data or image data, the process 400 extracts 410 the text data. The text data is extracted 410 by obtaining a glyph and string text representing the text data or by copying the text data at a hi-resolution. In other embodiments, the text data is extracted using any of the methods disclosed above in reference to the filtering module 304. The extracted 410 text data is encoded 412 by compressing the text data in a lossless manner. The data can be compressed using a lossless algorithm known in the art or as described above in reference to the text encoding module 308.

In addition to processing the extracted text data, the process 400 also transforms the extracted image data. The process 400 resizes 418 the image data using the image downsampling module. For example, an image of native resolution 960×960 may be downsampled to 320×320, or to 640×640 pixels representing the native resolution of the client device. The image is resized 418 by applying a downsampling algorithm described above or known in the art. Additionally, the image is encoded 420 by the image encoding module 312 to reduce the image's data size. In one embodiment, the image is encoded by applying a lossy encoding algorithm described above, such as JPEG, fractal compression, etc. Finally, the process 400 transmits 414, 422 the encoded image and text data over a network 110 to a client device 102 to provide it for further processing, for example, display or storage.

Configuration for Decoding Data

Figure 6:
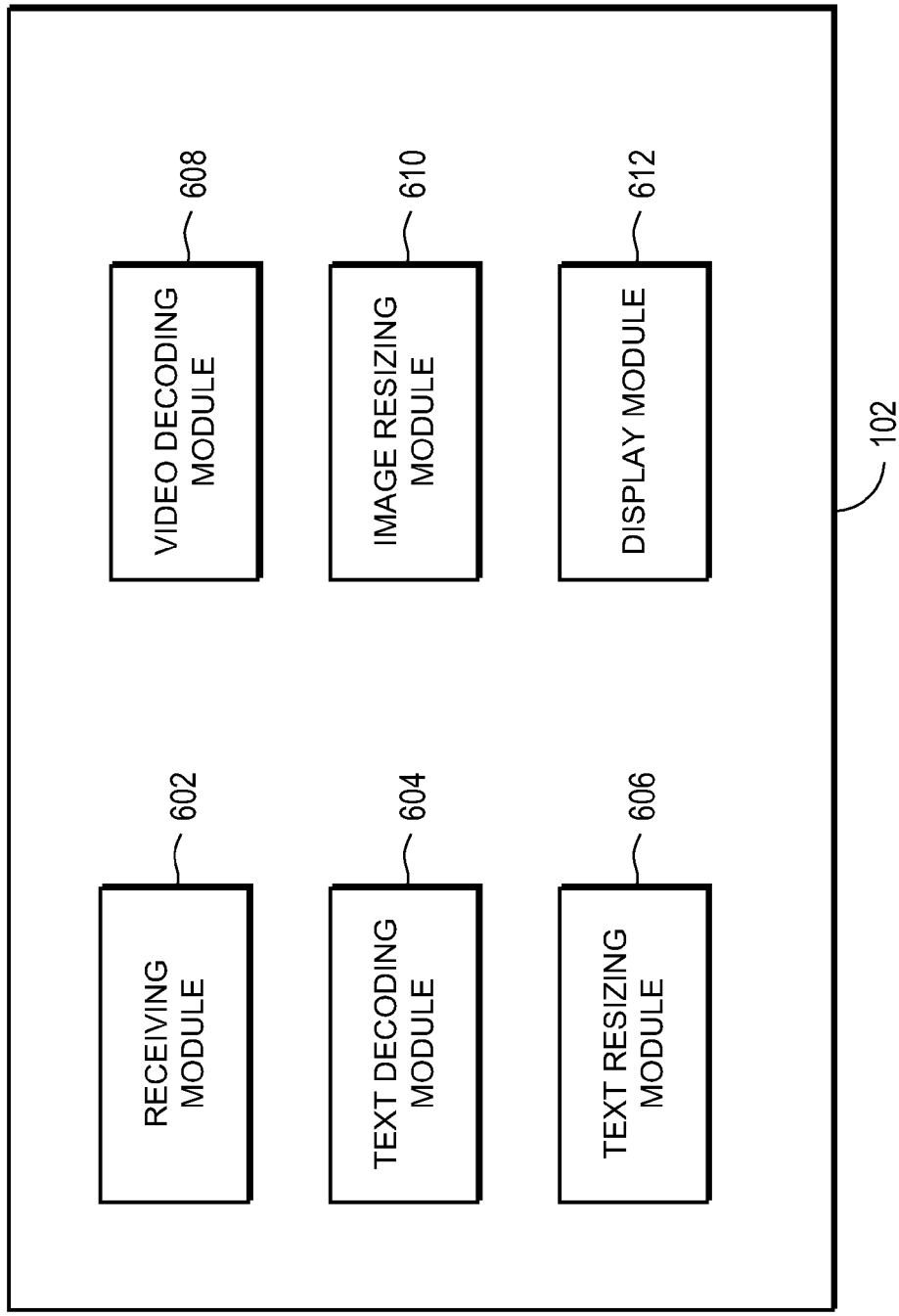
FIG. 6 illustrates one embodiment of a high level block diagram of a module for decoding data.

Referring now to FIG. 6, it illustrates an embodiment of a client device 102 configured to decode webpage data. As noted earlier, the client device 102 is structurally configured similar to the computing machine 200 and further configured as noted herein. The client device 102 configured to decode data is illustrated as a high-level block diagram of modules configured to decode text data and image data to render a webpage. Upon reviewing the descriptions herein, those of skill in the art will recognize that other embodiments can have different and/or other modules than the ones described here, and that the functionalities can be distributed among the modules in a different manner. The client device 102 configured to decode webpage data includes a receiving module 602, a text decoding module 604, a text resizing module 606, a video decoding module 608, an image resizing module 610, and a display module. The modules are configured to function and interoperate as described herein.

The client device 102 configured to decode data includes a receiving module 602 which receives encoded text and image data from an encoding server 106 over the network 110. In one embodiment, the receiving module receives the encoded text and the encoded image data responsive to a request for the data. In another embodiment, the receiving module 602 includes a data extractor to identify received data as text data or encoded image data.

The text decoding module 604 recreates the original full resolution text data as provided on a webpage. In one embodiment, the text decoding module 604 recreates the original text data using a run-length decoding algorithm. In other embodiments, other algorithms known in the art are used to recreate the encoded text data at a full resolution. In yet another embodiment, the text decoding module 604 stores the decoded text data locally on a network enabled client device 102.

The text resizing module 606 resizes the text data based on a first zoom level of the client device 102. In one embodiment, if the first zoom level of the client device's 102 display is set to view the full webpage, then the full resolution text data is resized accordingly. In another embodiment, the first zoom level of the client device 102 is pre-set, thus the text data is resized according to the first zoom level. The text data is therefore rendered to appear at a resolution appropriate for the zoom-level set on an application executing on the client device 102 and displaying the webpage data. In yet other embodiments, wherein the first zoom level requires that the text to be rendered at a full resolution, the text resizing module 606 functions to pass the full resolution data to the application executing on the client device to display the webpage.

In addition, the text resizing module 606 resizes the text data based on a second zoom level of the client device 102. In an embodiment where the decoded text data is resized and rendered at a first zoom level, the text resizing module 606 resizes the text data if a user locally changes the zoom level. For example, if the first zoom level on a client device 102 is set to display 100% of the webpage content, then the resizing module 606 resizes the text data to a resolution appropriate to view the full page. Furthermore, if a user changes the local zoom level to zoom-in on a part of the webpage, then the resizing module 606 retrieves the locally stored, decoded full resolution text data that is stored locally and resizes the text data to display at the second zoom level.

Continuing with FIG. 6, the video decoding module 608 decodes the received image data. In one embodiment, the video decoding module 608 recreates the original image data using conventional H.264 decoding procedures, such as inverse quantization, followed by inverse DCT transform. In other embodiments, other algorithms known in the art are used to recreate the image data. In another embodiment, the video decoding module 608 stores the decoded image data locally on a client device 102.

The image resizing module 610, resizes the decoded image data based on a first zoom level of the client device 102. In one embodiment, the if the first zoom level of the machine 102 is set to view a full webpage, then the image resizing module, resizes the image data such that an application executing on the client device 102 can display the full webpage image. In another embodiment, the first zoom level of the client device 102 is pre-set, thus the image data is resized accordingly.

The image resizing module 610, resizes the decoded image to correspond to a second zoom level if the zoom has been changed natively on the client device 102. For example, if the zoom level is changed by a user on the client device 102, the image resizing module displays a resized image responsive to the second zoom level. It is noted however, if the image resolution to be displayed is greater than the resolution of the decoded image, the image data may appears pixilated and blocky until the server 106 transmits hi-resolution desktop tile to the client device 102.

The display module 612 renders the resized text data and the resized image data on the display of a client device 102. In one embodiment, the display module 612 enables an application executing on the client device 102 to display the rendered text and image data on the client device 102. In one embodiment wherein local fonts on the client device are used to render the text data, the display module 612 displays the resized image at the local zoom level, and then renders the text at appropriate parts of the image. For example, if a pixel is replaced by the filtering module 304 on the encoding server 106, the display module 612 applies an inverse filtering algorithm to replace the background color with the recreated text data. In an embodiment wherein a user changes the local zoom level, the display module displays the resized image corresponding to the second level. In the same embodiment, if the text data is rendered using local fonts, then the display module 612 displays the resized font data. If the embodiment uses an image of the text data to render text, then the display 612 renders the appropriate resized text data onto the image.

Figure 7:
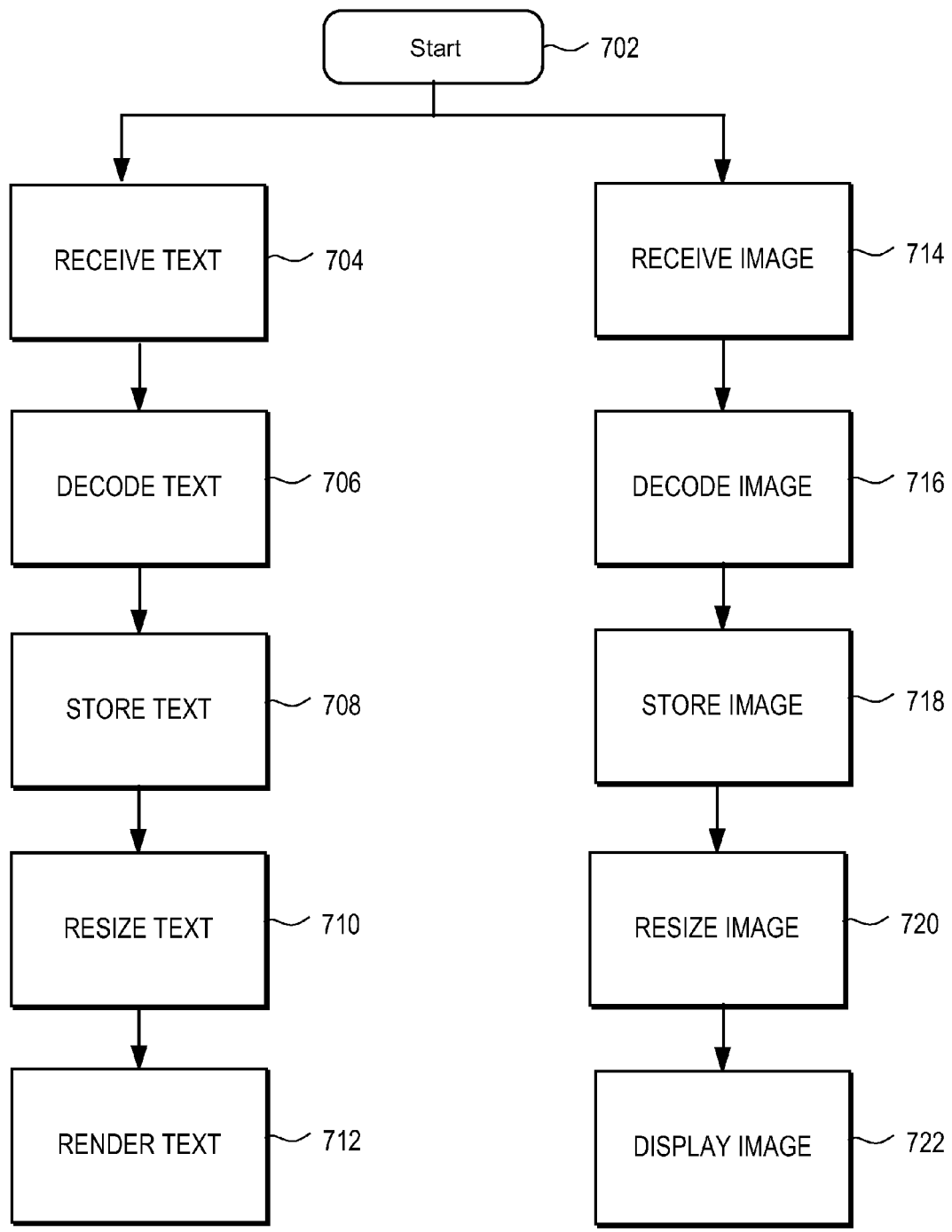
FIG. 7 illustrates one embodiment of a process for decoding data.

FIG. 7 is a flow chart illustrating the operation of a client device 102 according to one embodiment. The process starts 702 and receives 704 encoded text data and image data from an encoding server 106 over a network 110. The process, decodes 706 the received text and stores the decoded image locally on an image buffer. The process then uses the text resizing module 606 to resize the decoded text and render text onto an image. Additionally, the process employs a video decoding module 608 to decode 716 the image data. Subsequently the image is stored 718 locally on the client device and resized 720 corresponding to the client device's 102 first zoom level. The display module disclosed above displays 622 the image data. Those of skill in the art will recognize that other embodiments can perform the steps of FIG. 4 in different orders. Moreover, other embodiments can include different and/or additional steps than the ones described herein.

The process 700 starts 702 and receives 704 encoded text over the network 110. In one embodiment, received data is determined to be encoded text data by the presence of a 'transparent' color to do a chroma-key operation. In another embodiment, the presence of a compression scheme itself indicates the presence of text data.

The received 704 text data is decoded 706 by the text decoding module 604 to recreate the text data retrieved by the encoding server 106. In one embodiment the text data decoded and recreated as a hi-resolution image of the text data. For example, if the text data was retrieved as a full resolution image of the text data and encoded in a lossless manner, the decoded text data is decoded 706 and recreated at the full resolution. It is noted that in other embodiments, the decoded 706 text data comprises glyph and string text data. In another embodiment, the process 700 decodes 706 the text data by applying a run-length decoder.

The decoded data whether recreated as a glyph and string text data or a full resolution image of the text data is stored 708 locally on the client device 102. In one embodiment the string text data is stored 708 locally wherein the text data can be rendered onto the decoded image data as described in further detail below. In another embodiment, the decoded text data is first resized 710 as described below and then stored locally onto the resized image buffer of the client device 102.

In one embodiment, the stored text data is resized 710 according to a first zoom level of the application displaying the webpage on the client device 102. For example, a first zoom level may be determined by a pre-set zoom level such as 100% zoom level or it may be determined based on the resolution of the stored 708 text data. Additionally, the text data may be resized 710 one or more time based on whether the zoom level is changed locally on the client device 102. In one embodiment, at a second zoom level, the text data is resized to a second resolution. An illustration of the embodiment is described in further detail below in reference to FIGS. 8-13.

The resized 710 text data is rendered 712 using an application executing on the client device 102. In one embodiment, the text is rendered 712 on top of the resized 720 image data at the appropriate locations. In another embodiment, if a pixel is replaced by the filtering module 304 on the encoding server 106, an inverse filtering algorithm is applied to replace the background color with the rendered 712 text data.

Continuing with the process diagram of FIG. 7, the image data is received 714 by the data receiving module 602. In one embodiment, data is received over the network 110 and the receiving module determines the presence of image data based on the presence of compressed data or other methods disclosed above. In other embodiments, image data is sent separately over the network 110 and is separately received 714 by the data receiving module 602.

The received image data is then decoded 716 using one of the methods described above, such as a conventional H.264 decoding procedure. The decoded data is then stored 718 locally and resized 720 according to a first zoom level of the client device 102. The resized image is then displayed 722 on the device at a resolution appropriate for the first zoom level.

Example Configuration

Figure 8:
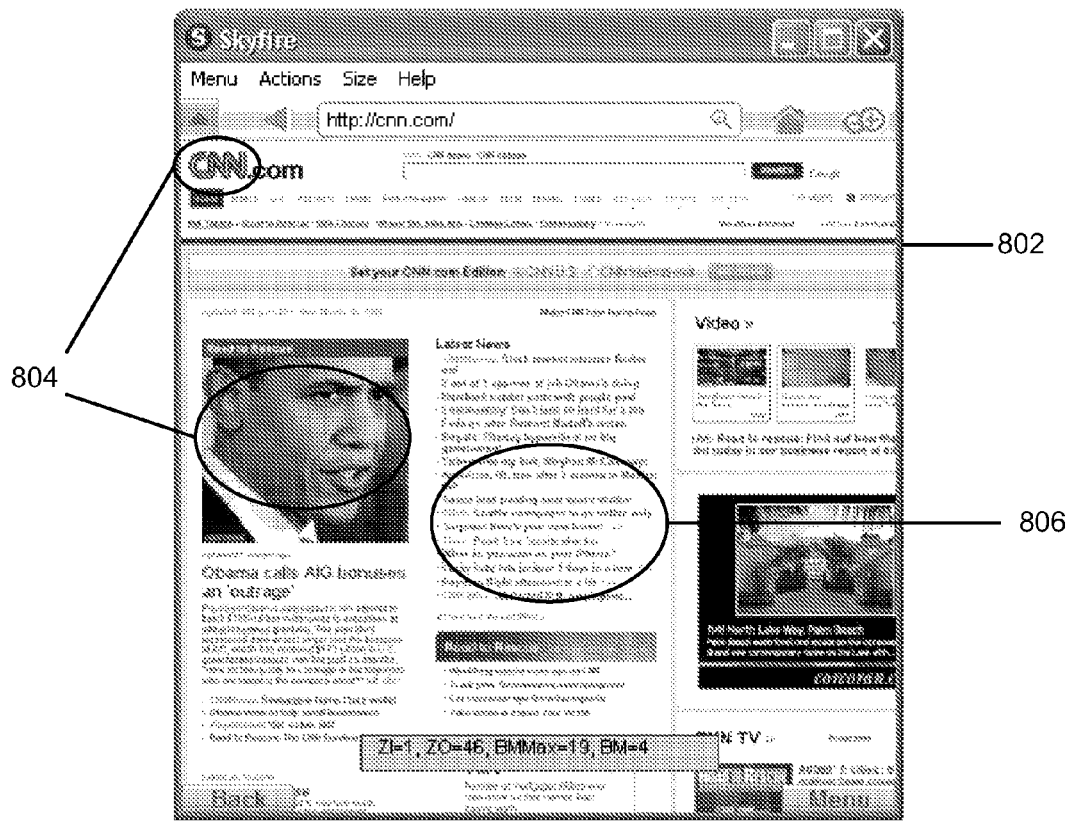
FIG. 8 illustrates an image of a webpage loaded on client device at a first zoom level.
Figure 9:
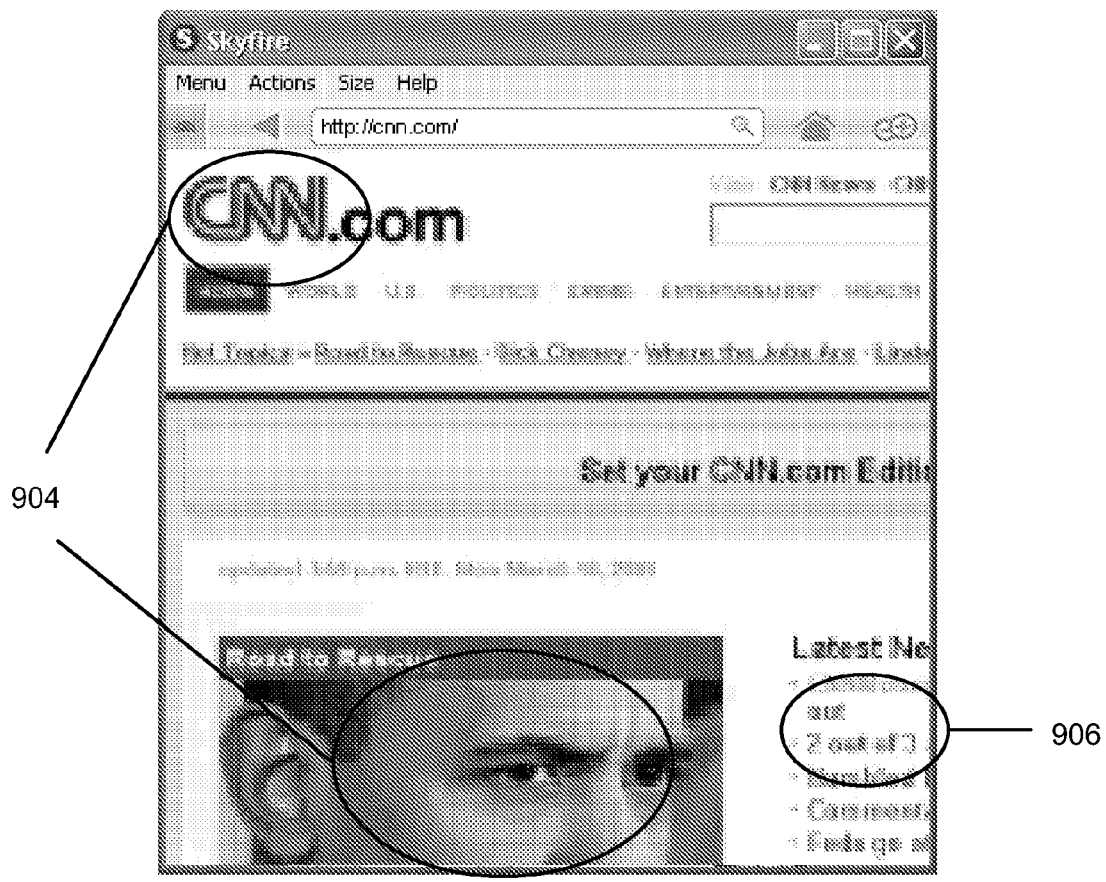
FIG. 9 illustrates the same webpage image of FIG. 8 at a second, zoomed-in level.

FIGS. 8 and 9 illustrate an image of a webpage where no text extraction is performed and the entire webpage data is encoded as image data on the encoding server 106 and decoded as image data on a client device 102. FIGS. 10, 11, 12 and 13 illustrate an application of the embodiments disclosed herein. The advantages of the present embodiments are also discussed herein with the discussion of FIGS. 8 to 13.

FIG. 8 illustrates an application 802 executing on a client device 102 displaying a thumbnail tile of a webpage. A thumbnail tile T1 as discussed in reference to FIG. 5 is used to get a high-level, zoomed out version of the webpage for easy navigation. It should be noted that unlike the embodiments described herein, FIG. 8 shows webpage data that is encoded as image data 804 and 806 without performing a filtration step to determine and extract and encode text data on the encoding server 106 and text decoding step on the client device 102, as disclosed above.

FIG. 9 illustrates the problem normally associated with treating all the webpage data as image only. To give the user the zoomed in version, the application executing on the client device 102 will take the thumbnail tile and zoom it up to the appropriate zoom level. However, since the client device 102 only has the thumbnail tile to draw a more detailed zoomed-in image, it results in the user seeing a blocky, stretched image. All portions of the image looks blocky, including the text data 906 and the image data 904. The entire image remains blocky at this intermediate stage until the server sends the hi-resolution, desktop tiles to the client device.

Figure 10:
FIG. 10 illustrates one embodiment of webpage decoded a first zoom level according to a method disclosed herein.

FIG. 10 illustrates an example application of the configuration described herein. The decoded webpage data is displayed on an application 1002 executing on a client device 102. In one embodiment, FIG. 10 illustrates webpage data displayed at a first resolution, wherein the image data 1004 is low resolution image data, encoded at the encoding server 106, decoded and resized on the client device 102 to correspond to the first zoom level. Additionally, FIG. 10 illustrates text data 1006, wherein the text data is hi-resolution text data resized to correspond to the first zoom level or a rendering of glyph plus string data. It should be noted that at the illustrated first zoom levels in FIG. 8 and FIG. 10 the two webpage appear visually similar.

Figure 11:
FIG. 11 illustrates one embodiment of a webpage decoded at a second, zoomed-in level, according to a method disclosed herein.

FIG. 11 illustrates an exemplary embodiment at an intermediate stage as disclosed herein. The illustrated webpage is decoded and displayed at a second zoom level as disclosed above. In FIG. 11, the text data 1106 is sent as either full resolution image data or as glyph plus string data. Since the text is full resolution, it allows the text data to be perfectly rendered at all zoom levels including the second zoom level of FIG. 11. However, the image portion of the page is sent at a partial resolution, thus the image data 1104 appears blocky and stretched out at the zoomed in level, similar to the image data of FIG. 9. Thus the present embodiment has the advantage of showing hi-resolution text data in an intermediate stage, allowing the user to interact and zoom into a particular part of the webpage without interrupting the reading experience by forcing the user to wait while the hi-resolution file is retrieved and processed on the client device 102.

Figure 12:
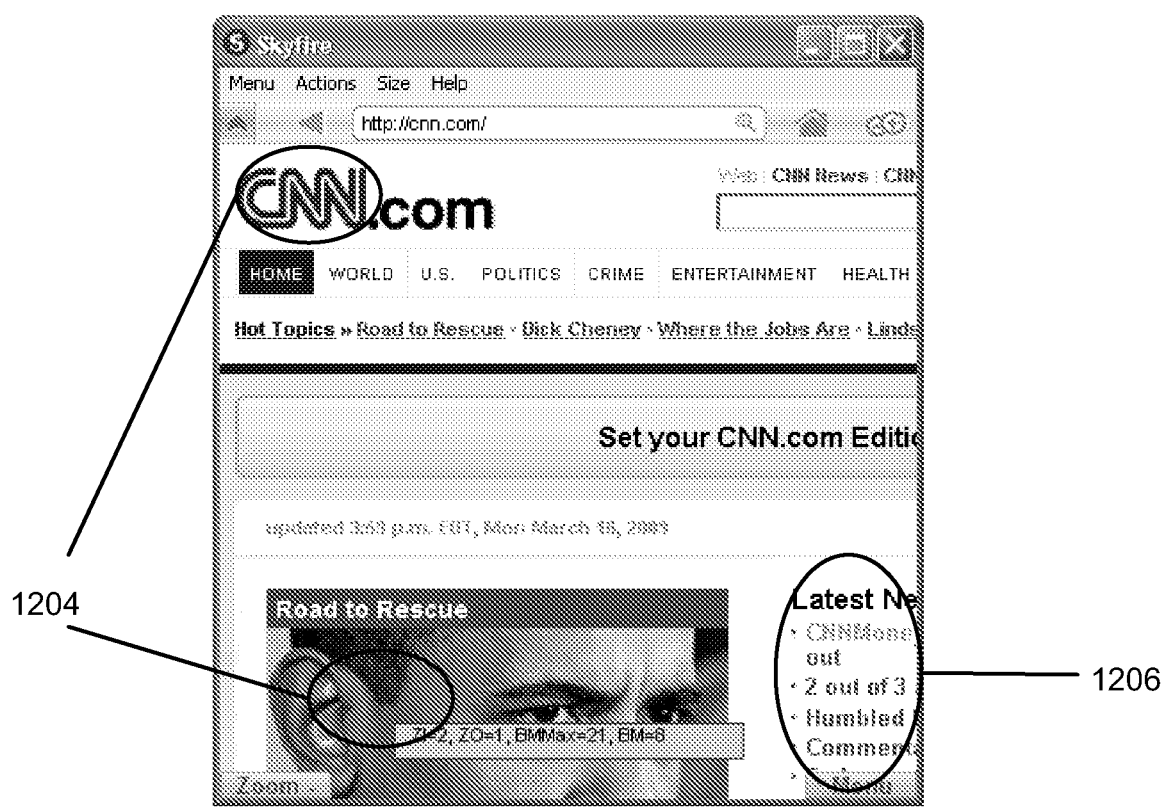
FIG. 12 illustrates one embodiment of a webpage decoded at a second, zoomed-in level, wherein the webpage is loaded with hi-resolution data.

FIG. 11 however, represents only an intermediate stage, while the device is waiting for hi-resolution desktop tile data, as described in reference to FIG. 5*b*. FIG. 12 describes the second stage, where once the server fetches the higher resolution data, the user will see all the content of the webpage including image 1204 and text 1206 at a hi-resolution. However, such a fetch operation takes a long time because the desktop tile data is generally a large data file and must be processed on the encoding server, and sent over a resource limited network to the client device. If the user in unable to read webpage text data during this slow fetch and rendering operation, it disrupts the continuity of the user reading and browsing experience.

Figure 13:
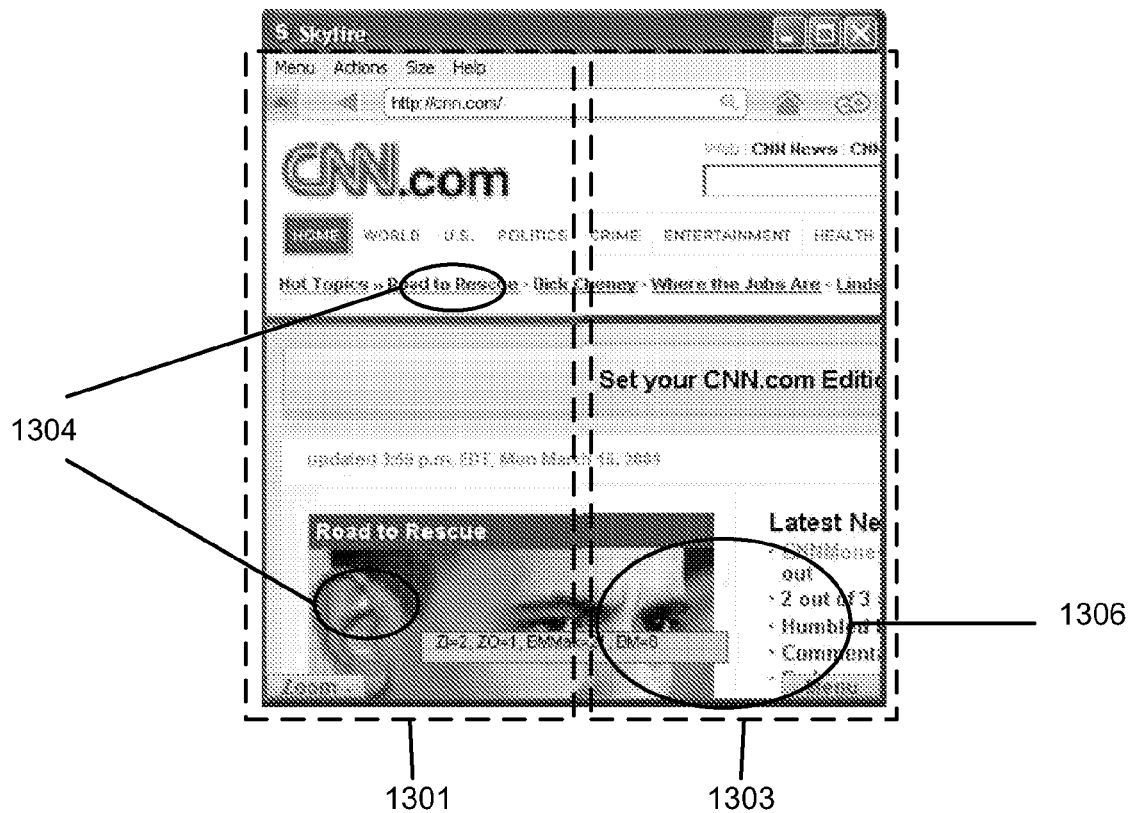
FIG. 13 illustrates one embodiment of a webpage decoded at a second, zoomed in level, wherein a portion of the webpage is loaded with hi-resolution data and another portion of the webpage is loaded with low resolution data.

FIG. 13 illustrates a portion of the webpage comprising hi-resolution desktop tile 1303 and another portion of the page showing low resolution thumbnail tile 1301. As noted above, the thumbnail tile 1301 portion of the webpage data appears blocky and pixilated, including text and image data 1304. However, the image and text data 1306 of the webpage represented by the desktop tile 1303 does not appear blocky or pixilated. Thus, allowing the client device 102 to provide hi-resolution desktop tiles 1303 when available, and presenting low-resolution thumbnail tiles 1301 while the client device 102 is waiting for the hi-resolution image or when the hi-resolution tile is unavailable.

Thus the illustrated embodiment presents an advantage over prior art. For example, even after the slow hi-resolution desktop tile 1303 is delivered and loaded on the client device 102, showing hi-resolution text and image, if the user scrolls around the page, the user will see the non-desktop tile portion of the webpage at a low-resolution including the text data. This disrupts the browsing/reading experience because in prior art, the text and image data is encoded as low resolution thumbnail tile 1301 rendering the text data unreadable. The present embodiment has the advantage of showing hi-resolution text data 1304 even after hi-resolution desktop tile 1303 is loaded onto the client device 102. Thus the present embodiment allows for a richer browsing experience where the user can continue to interact with the displayed webpage without disrupting the reading/browsing experience.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described in FIGS. 3 and 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations, e.g., as described with FIGS. 4, 7 on data stored as bits or binary digital signals within a machine memory (e.g., a computer memory 204 or storage 216). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing hi-resolution text data to a client device allowing for a rich browsing experience while providing much faster data delivery and load times through the disclosed principles herein. For example, the server encodes the text and image data such that the text data does not lose any resolution and can be rendered perfectly at any zoom level on the client device. Image data is considered less important to the browsing experience, however, as is delivered as a low resolution image data which may appear blocky and stretched out during an intermediate stage after the zoom in and before a hi-resolution image is retrieved and delivered to the client device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for encoding data within a webpage for display on a mobile device connected to a network, the method comprising:
retrieving webpage content;
identifying text data within the webpage content;

extracting text data from the webpage at a full resolution, the extracted text data comprising string text or an image of the text data;
applying a lossless encoder to the text data to generate encoded text data comprising compressed, full resolution text data;
identifying image data within the webpage content;
extracting the image data from the webpage content at the full resolution;
downsampling the image data from the full resolution to a lower resolution;
applying a lossy encoder to the downsampled image data to generate encoded image data comprising compressed, lower resolution image data;
dividing the webpage content into one or more thumbnail tiles, each thumbnail tile including the encoded full resolution text data and the encoded lower resolution image data;
transmitting the one or more thumbnail tiles to the mobile device, the webpage content reconstructable at the mobile device using the one or more thumbnail tiles so that the reconstructed webpage content includes the full resolution text data and the lower resolution image data; and
responsive to receiving an instruction to zoom in on a portion of the webpage content:
dividing each thumbnail tile into a plurality of desktop tiles, each desktop tile including the full resolution text data and the full resolution image data; and
transmitting a desktop tile corresponding to the portion of the webpage to the mobile device for reconstructing the full resolution webpage content using the desktop tile.

2. The method of claim 1, wherein extracting the text data further comprises copying the text data at a full resolution.

3. The method of claim 1, further comprising encoding the text data based on metadata associated with the webpage.

4. The method of claim 1, further comprising transmitting to the mobile device a text library corresponding to the text format capability of the mobile device.

5. A non-transitory computer readable medium configured to store instructions, the instructions when executed by a processor cause the processor to:
retrieve content of the webpage;
identify text data within the webpage content;
extract text data from the webpage at a full resolution, the extracted text data comprising string text or an image of the text data;
apply a lossless encoder to the text data to generate encoded text data comprising compressed, full resolution text data;
identify image data within the webpage content;
extract the image data from the webpage content at the full resolution;
downsample the image data from the full resolution to a lower resolution;
apply a lossy encoder to the downsampled image data to generate encoded image data comprising compressed, lower resolution image data;
divide the webpage content into one or more thumbnail tiles, each thumbnail tile including the encoded full resolution text data and the encoded lower resolution image data;
transmit the one or more thumbnail tiles to the mobile device, the webpage content reconstructable at the mobile device using the one or more thumbnail tiles so that the reconstructed webpage content includes the full resolution text data and the lower resolution image data; and
responsive to receiving an instruction to zoom in on a portion of the webpage content:
divide each thumbnail tile into a plurality of desktop tiles, each desktop tile including the full resolution text data and the full resolution image data and
transmit a desktop tile corresponding to the portion of the webpage to the mobile device for reconstructing the full resolution webpage content using the desktop tile.

6. The non-transitory computer readable medium of claim 5, wherein the instructions to extract the text data further comprises instructions that when executed by the processor cause the processor to copy the text data at a full resolution.

7. The non-transitory computer readable medium of claim 5, wherein the instructions to encode the text data further comprises instructions that when executed by the processor cause the processor to encode the text based on metadata associated with the webpage.

8. The non-transitory computer readable medium of claim 5, further comprising instructions that when executed by a processor cause the processor to transmit to the mobile device a text library corresponding to the identity and the text formatting capability of the mobile device.

9. A method for viewing encoded data using an application executing on a mobile device, the method comprising:
receiving a thumbnail tile including encoded text and image data extracted from a webpage captured at a first resolution, the text data encoded at the first resolution and the image data encoded at a lower resolution;
decoding the received text data to produce text data at the first resolution;
decoding the received image data to produce image data at the lower resolution;
storing the decoded first resolution text data and the decoded lower resolution image data;
resizing the stored text and image data to a second resolution corresponding to a first zoom level of the application executing on the mobile device, the second resolution lower than the first resolution;
displaying, by the application executing on the mobile device, the resized text and image data at the second resolution;
receiving an instruction to change the first zoom level to a second zoom level corresponding to a third resolution, the third resolution greater than the second resolution;
resizing the stored text data to the third resolution; and
displaying, by the application executing on the mobile device, the resized text data at the third resolution and the resized image data at the second resolution.

10. The method of claim 9, further comprising:
sending a request to an encoding server to retrieve third resolution image data corresponding to the second zoom level.

11. A non-transitory computer readable medium configured to store instructions, the instructions when executed by a processor cause the processor to:
receive a thumbnail tile including encoded text and image data extracted from a webpage captured at a first resolution, the text data encoded at the first resolution and the image data encoded at a lower resolution;
decode the received text data to produce text data at the first resolution;
decode the received image data to produce image data at the lower resolution;

store the decoded first resolution text data and the decoded lower resolution image data;

resize the stored text and image data to a second resolution corresponding to a first zoom level of the application executing on the mobile device, the second resolution lower than the first resolution;

display the resized text and image data at the second resolution;

receive an instruction to change the first zoom level to a second zoom level corresponding to a third resolution, the third resolution greater than the second resolution;

resize the stored text data to the third resolution; and display the resized text data at the third resolution and the resized image data at the second resolution.

12. The non-transitory computer readable medium of claim 11, further comprising instructions that cause the processor to:

send a request to an encoding server to retrieve third resolution image data corresponding to the second zoom level.

13. The method of claim 1, wherein extracting the text data further comprises representing the text data in a text format.

14. The method of claim 1, further comprising encoding the text data based on an applied filtering mechanism.

15. The non-transitory computer readable medium of claim 5, wherein the instructions to extract the text data further comprises instructions that when executed by the processor cause the processor to represent the text data in a text format.

16. The non-transitory computer readable medium of claim 5, wherein the instructions to encode the text data further comprises instructions that when executed by the processor cause the processor to encode the text based on an applied filtering mechanism.

17. The method of claim 9, further comprising:

receiving a desktop tile including image data encoded at the first resolution;

resizing the image data encoded at the first resolution to the third resolution; and displaying the resized image data at the third resolution.

18. The non-transitory computer readable medium of claim 11, further comprising instructions that when executed by the processor cause the processor to:

receive a desktop tile including image data encoded at the first resolution;

resize the image data encoded at the first resolution to the third resolution; and display the resized image data at the third resolution.

* * * * *